(12) United States Patent
Kay et al.

(10) Patent No.: US 8,860,408 B2
(45) Date of Patent: Oct. 14, 2014

(54) APPARATUS FOR SUPPORTING A DISK DRIVE, DISK DRIVE TEST APPARATUS AND METHOD OF TESTING A DISK DRIVE

(75) Inventors: Alexander Stephen Kay, Southsea (GB); Philip Edward Long, Loughrea (IE)

(73) Assignee: Xyratex Technology Limited, Havant (GB)

( * ) Notice: Subject to any disclaimer, the term of this patent is extended or adjusted under 35 U.S.C. 154(b) by 337 days.

(21) Appl. No.: 13/375,169

(22) PCT Filed: Jun. 1, 2010

(86) PCT No.: PCT/GB2010/050916
§ 371 (c)(1), (2), (4) Date: Jan. 5, 2012

(87) PCT Pub. No.: WO2010/139989
PCT Pub. Date: Dec. 9, 2010

(65) Prior Publication Data
US 2012/0105056 A1    May 3, 2012

Related U.S. Application Data

(60) Provisional application No. 61/184,486, filed on Jun. 5, 2009.

(51) Int. Cl.
*G01R 33/12* (2006.01)
*G11B 33/08* (2006.01)
*G11B 33/12* (2006.01)

(52) U.S. Cl.
CPC ............. *G11B 33/08* (2013.01); *G11B 33/121* (2013.01)
USPC ........................................................ 324/212

(58) Field of Classification Search
CPC .............. G06Q 10/00; G06Q 2220/00; G06Q 2230/00; G11B 2005/00; G11B 2209/00; G11B 2220/00; G06K 1/00; G11C 5/00; G11C 2013/00; G11C 2207/00; G11C 2211/00; G11C 2213/00; G11C 2216/00
USPC ........................................................ 324/212
See application file for complete search history.

(56) References Cited

U.S. PATENT DOCUMENTS

| | | |
|---|---|---|
| 5,390,891 A | 2/1995 | Hornung et al. |
| 6,018,437 A | 1/2000 | Weichelt et al. |

(Continued)

FOREIGN PATENT DOCUMENTS

| | | |
|---|---|---|
| WO | 97/06532 | 2/1997 |
| WO | 03/021597 | 3/2003 |

(Continued)

OTHER PUBLICATIONS

International Search Report mailed Oct. 15, 2010 in corresponding International Patent Application No. PCT/GB2010/050916.

*Primary Examiner* — Huy Q Phan
*Assistant Examiner* — Temilade S Rhodes-Vivour
(74) *Attorney, Agent, or Firm* — Pillsbury Winthrop; Shaw Pittman LLP

(57) ABSTRACT

There is disclosed apparatus for supporting a disk drive, disk drive test apparatus and a method of testing a disk drive. The apparatus for supporting a disk drive includes: a housing, a slot for receiving a disk drive, and a plurality of isolators. The slot is received in the housing and has a longitudinal axis. The isolators are disposed between the slot and the housing for isolating the slot from the housing. The isolators are arranged with respect to the longitudinal axis such that the slot has a low rotational stiffness in the direction of the longitudinal axis relative to the rotational stiffness in at least one other direction.

14 Claims, 6 Drawing Sheets

(56) References Cited

U.S. PATENT DOCUMENTS

| | | |
|---|---|---|
| 6,571,454 B1 * | 6/2003 | Haney et al. ............... 29/603.03 |
| 6,696,831 B2 * | 2/2004 | Nozu ........................... 324/210 |
| 2002/0043608 A1 | 4/2002 | Nakata et al. |
| 2004/0264121 A1 | 12/2004 | Orriss et al. |
| 2005/0030014 A1 * | 2/2005 | Green et al. ................. 324/212 |
| 2006/0067060 A1 * | 3/2006 | Zimlin ........................ 361/724 |
| 2006/0098332 A1 | 5/2006 | Lee et al. |
| 2007/0058335 A1 * | 3/2007 | Brown et al. ................ 361/685 |
| 2008/0007865 A1 | 1/2008 | Orriss et al. |
| 2008/0239654 A1 * | 10/2008 | Bisson et al. ................ 361/685 |
| 2009/0261229 A1 * | 10/2009 | Merrow ....................... 248/560 |

FOREIGN PATENT DOCUMENTS

| | | |
|---|---|---|
| WO | 03/021598 | 3/2003 |
| WO | 2004/114286 | 12/2004 |

* cited by examiner

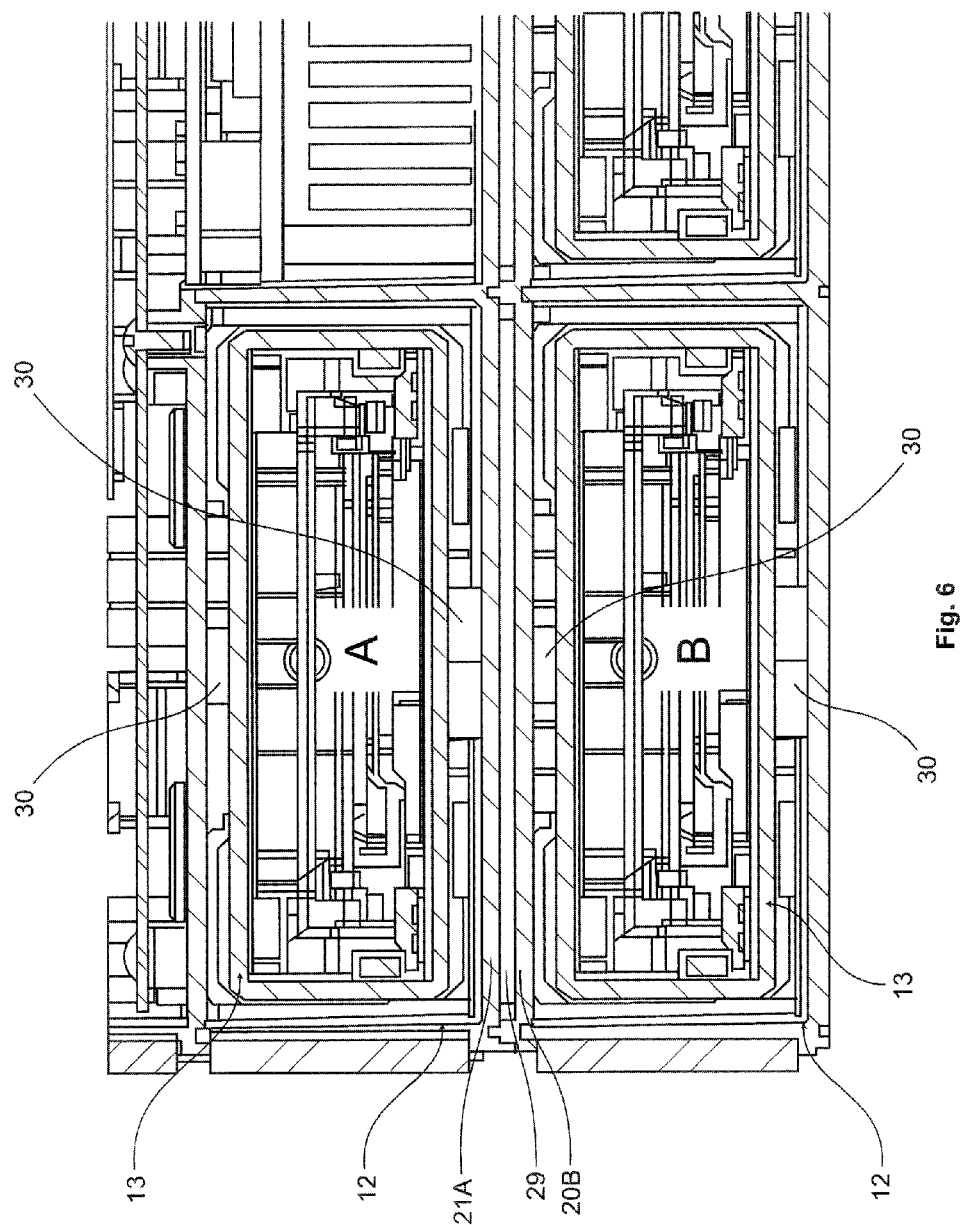

APPARATUS FOR SUPPORTING A DISK DRIVE, DISK DRIVE TEST APPARATUS AND METHOD OF TESTING A DISK DRIVE

CROSS REFERENCE TO RELATED APPLICATIONS

This application is the National Phase entry of PCT/GB2010/050916, which claims priority to United States Provisional Patent Application No. 61/184,486, filed Jun. 5, 2009. The content of these applications is incorporated herein by reference in their entirety.

The present invention relates to apparatus for supporting a disk drive, to a disk drive test apparatus and to a method of testing a disk drive.

The present invention has particular application when testing a disk drive during the manufacturing process, for example a so-called Back End Test (BET). However, the present invention has application to mounting of a disk drive during a servo-writing process (when servo tracks are written to the disk drive, including the case where a separate clock head is used as well as the self-servo writing process and the self-servo fill process), and during normal end use of the disk drive by an end user.

Examples of arrangements for supporting a disk drive are disclosed in U.S. Pat. No. 6,018,437, WO-A-97/06532, WO-A-03/021597, WO-A-03/021598 and WO-A-2004/114286, the entire disclosures of which are hereby incorporated by reference. In many of these arrangements, the disk drive is supported in a carrier (or "tray") which is inserted into and removed from a housing (or "chassis"). Typically, this insertion and removal is automated and is carried out by a robotic arm.

As is well known, vibrations arising in the apparatus can affect the operation of the disk drive and it is therefore desirable to minimise the effect of such vibrations. This is particularly important during manufacture and testing of a disk drive as these processes are particularly susceptible to error. Vibrations mainly arise from rotation of the disk and/or the pivoting movement of the disk arm that carries the read/write head or heads. There is also often a fan present, which gives rise to its own vibrations. In addition, there may be other sources of vibration within the test apparatus, including for example automation used for exchanging disk drive units in the apparatus, power supply units for supplying power to the apparatus, computing apparatus used for controlling operation of the apparatus, and pumps and water flow used for cooling the apparatus. To minimise the effect of vibrations, typically the disk drive is effectively clamped to a large mass. As is well known, in general the greater the mass, the lower the frequency of the rotational mode of the combination of the disk drive and carrier. Whilst in principle it is possible to increase the mass, this becomes very problematic when plural disk drives are being operated on in the same housing. For example, existing servo writing and/or testing apparatus may operate on one thousand or more disk drives simultaneously. Simply increasing the mass to which each disk drive is clamped can result in the housing having a very large mass overall, and also inevitably increases the cost of the equipment because of both the capital cost of the masses themselves and also the cost of the additional supporting arrangements that are needed to support such a heavy total mass.

According to a first aspect of the present invention, there is provided apparatus for supporting a disk drive, the apparatus comprising: a housing; a slot for receiving a disk drive, the slot being received in the housing and having a longitudinal axis; and, a plurality of isolators disposed between the slot and the housing for isolating the slot from the housing, the isolators being arranged with respect to the longitudinal axis such that the slot has a low rotational stiffness in the direction of the longitudinal axis relative to the rotational stiffness in at least one other direction.

By positioning isolators with respect to the longitudinal axis the rotational stiffness of the slot about the longitudinal axis can be made low relative to the rotational stiffness of the slot about other axes. It follows from this arrangement that the natural frequency of the slot about the longitudinal axis can be made lower. This is advantageous in situations where there are noise sources at relatively high frequencies that tend to excite rotational vibration of the slot about the longitudinal axis. In particular, by lowering the natural frequency of the slot this means that the noise sources occur at a higher frequency than the natural frequency get attenuated. In other words the system is better isolated from rotational vibration about the longitudinal axis. This is in contrast to prior art arrangements of isolators, where some of the noise sources may coincide with the natural frequency about the longitudinal axis and hence excite greater vibration in this mode.

Preferred placement of the isolators with respect to the longitudinal axis does not interfere with tuning the isolation system to address different modes of vibration. For example, the isolators can be spaced from each other along the longitudinal axis to provide greater rotational stiffness about orthogonal axes to longitudinal axis. Therefore the natural frequency of the system in other modes of vibration is not constrained to also be low. Thus the system can be tuned to the sources of noise expected given the particular application. This can be done without introducing heavy mass to the system as in prior art approaches to this problem.

Preferably the slot has a first face, the first face having a centreline parallel with the longitudinal axis, wherein at least one of said plurality of isolators is positioned on the centreline of the first face. Preferably the slot has a second face, the second face having a centreline parallel with the longitudinal axis, wherein at least one of said plurality of isolators is positioned on the centreline of the second face. Preferably the slot has a second face, the second face having a centreline parallel with the longitudinal axis, wherein each isolator of said plurality is positioned on either the centreline of the first face or the centreline of the second face. By positioning some or all of the isolators on the centrelines of the faces, the isolators are brought closer to the axis of rotation of the slot about the longitudinal axis. This leads to reduced stiffness about the longitudinal axis. This arrangement does not affect the ability of the system to provide stiffness about other axes. For example, by spacing the isolators at various points along the centrelines, increased stiffness can be provided to other modes of vibration, whilst still providing a low frequency mode about the longitudinal axis.

Preferably two isolators are positioned respectively on the centrelines of the first and second faces so as to be towards one end of the slot and diametrically opposed to each other. This provides a firm reaction surface at the rear of the slot. This is useful in isolating the slot from cross talk in neighbouring slots, as well as in resisting plugging force when disk drive exchange is carried out.

Preferably an isolator is positioned on the centreline of the first face at the opposite end of the slot to the two diametrically opposed isolators. This helps provide damping for vibration of the slot about the axis of the diametrically opposing isolators. This also helps avoid the effects of temperature induced creep of the front end of the slot, which helps the automation carry out disk exchange.

Preferably the slot comprises a disk drive receiving portion located at the opposite end of the slot to the two diametrically opposed isolators. This arrangement has the advantage of moving the axis of rotation of the slot about the diametrically opposing isolators outside the disk drive receiving portion of the slot, which in turn reduces the affects of this mode of vibration on the disk drive.

Preferably an isolator is positioned midway along the centreline of the second face. This isolator provides the primary support for the slot in the housing. The slot is in effect balanced on this isolator, allowing low stiffness about the longitudinal axis. This isolator can also be used to provide some damping by appropriately shaping the isolator.

Preferably the separation of the first and second faces is less than the width and the height of the first and second faces. This brings the centrelines closer together and thus closer to the axis of rotation. This in turn reduces the stiffness of the slot to rotation about the axis of rotation.

In practice, the first and second faces of the slot may be horizontal in use, with the disk drive unit in the slot positioned relative to the slot such that the disk is parallel with the faces and therefore horizontal in use. Thus the longitudinal axis in this configuration would be parallel to the disk.

Preferably each isolator does not extends from the centreline of the face on which it is positioned by more than a distance D, where D=25% of the distance from that centreline 33,34 to the side edge of the slot. This allows the stiffness of the slot to rotation about the axis of rotation to be made low by keeping the isolators close to the axis of rotation.

Preferably at least some of said isolators are positioned close to the centre of rotation of the slot in the direction of said longitudinal axis such that less rotational stiffness is provided by said at least some isolators in the direction of the longitudinal axis than in said other direction.

Preferably the apparatus comprises at least two slots as described above, the two slots being adjacent each other such that the first face of one slot is next to the second face of the other slot, wherein an isolator on one of the faces is spaced longitudinally from all isolators on the other face. This arrangement means that at least this isolator does not share a common reaction surface with the other isolators. Instead for a force to be transmitted from this isolator to one of the other isolators it must pass along a section of the housing. The effect of this is that some of the vibration energy is dissipated as it passes along the housing, meaning that some additional damping is obtained. This decreases the risk of cross talk between adjacent slots.

In another embodiment, the apparatus comprises at least two slots as described above, the two slots being adjacent each other such that the first face of one slot is next to the second face of the other slot, wherein the housing between the two slots comprises two spaced walls arranged such that the first wall is at least partially isolated from the second wall. Thus a gap is created between the two walls separating the two slots. The two walls respectively provide two independent reaction surfaces to the two slots so that cross talk between the two slots is minimised.

According to a second aspect of the present invention, there is provided disk drive test apparatus comprising apparatus for supporting a disk drive as described above and a test module for testing a said disk drive.

According to a third aspect of the present invention, there is provided a method of testing a disk drive, the method comprising: supporting a disk drive in a disk drive test apparatus such that the disk drive has a low rotational stiffness in the direction of a longitudinal axis of the disk drive relative to the rotational stiffness in at least one other direction; and, testing the disk drive.

Embodiments of the present invention will now be described by way of example with reference to the accompanying drawings, in which:

FIG. 6 shows a partial side on a cross section view of another example of a disk drive test apparatus according to an embodiment of the present invention.

Figure 1:
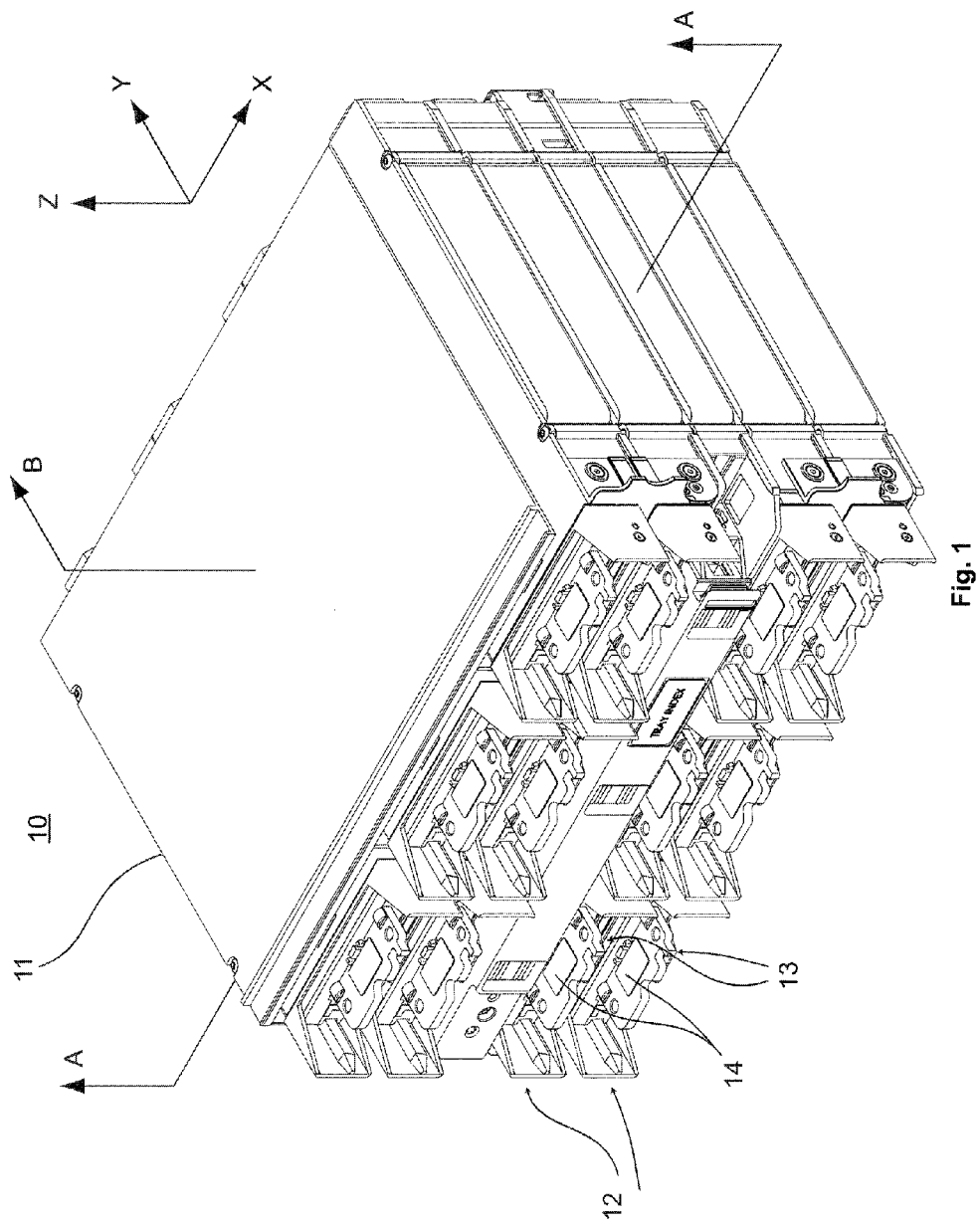
FIG. 1 shows a view from the front, side and top of an example of a disk drive test apparatus according to an embodiment of the present invention.

Referring to FIG. 1, an example of a disk drive testing apparatus 10 is shown such as may be used for BET (Back End Test) or self servo writing or servo filling. It should be noted that in the following, as shown in the drawings, the x-axis is defined as running horizontally from the left side to the right side of the apparatus, the y-axis is defined as running horizontally from the front end to the rear end of the apparatus, and the z-axis is defined as running vertically upward. Within this co-ordinate system Lx, Ly and Lz refer respectively to linear motion in the direction of the x-axis, y-axis and z-axis and Rx, Ry and Rz refer respectively to rotational movement around the x-axis, y-axis and z-axis.

The apparatus 10 comprises a housing 11 having walls that define a 3×4 array of cells 12. A slot 13 is positioned in each of the cells 12. The mounting of each slot 13 in its cell 12 is described in more detail below. Each slot 13 has a tray 14 at the front end of the slot 13 which is arranged to hold the disk drive unit being tested in that slot. The tray 14 can be withdrawn from the slot 13 in order to make the disk drive unit accessible to facilitate exchanging disk drive units in that slot 13. In a manufacturing environment, automation (not shown) may be used to automatically exchange the disk drive units.

Figure 2:
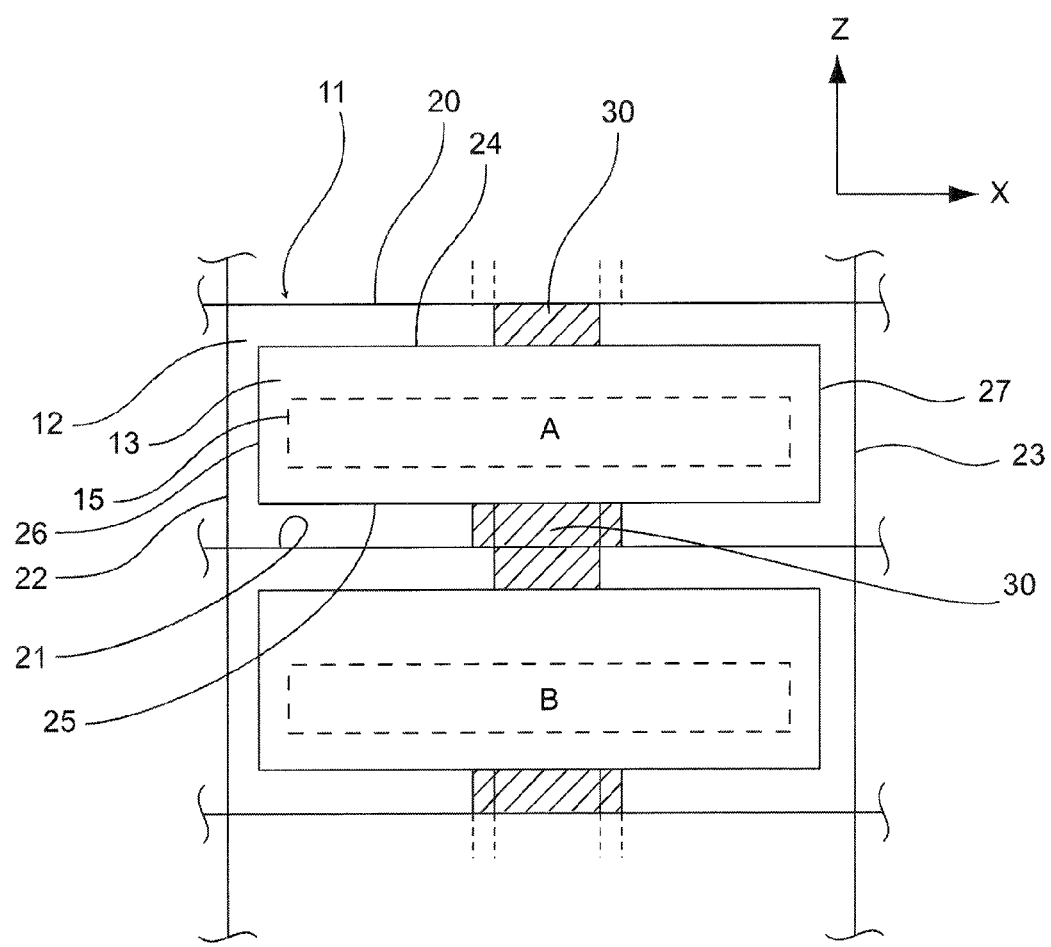
FIG. 2 shows schematically a partial end on cross section view of the apparatus of FIG. 1 along lines A-A showing two vertically adjacent slots of the apparatus.
Figure 3:
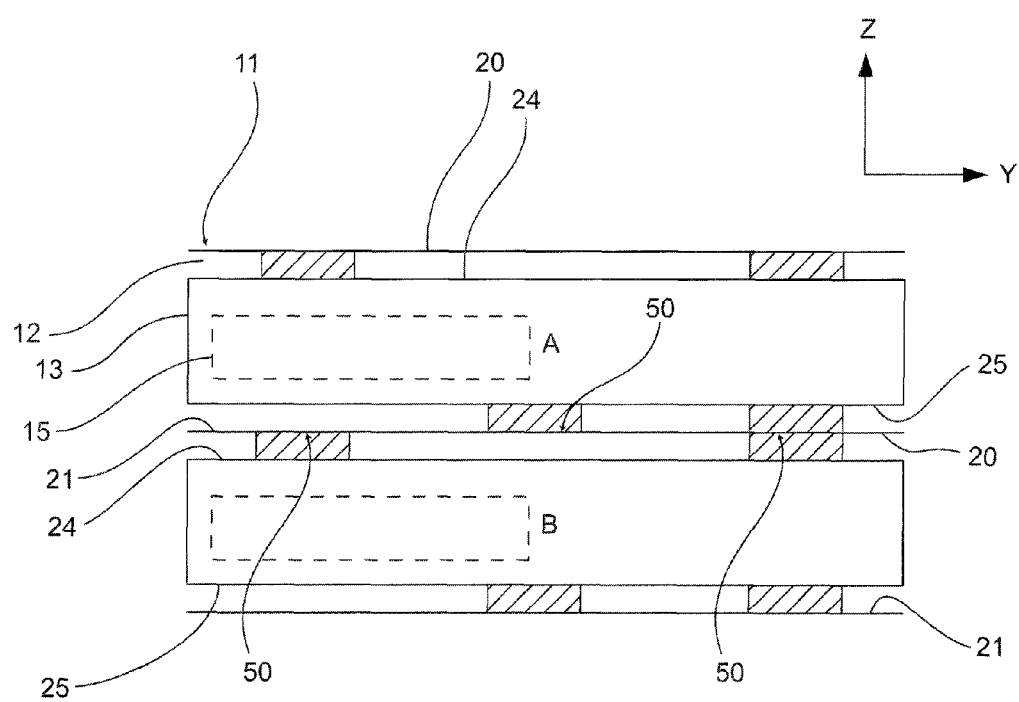
FIG. 3 shows schematically a partial side on cross section view of the apparatus of FIG. 1 along lines B-B showing the two slots of FIG. 2.

Referring now to FIGS. 2 and 3, the position of each disk drive unit 15 is shown within its slot 13 (For clarity, the trays 14 are not shown in FIGS. 2 and 3 and the disk drive units 15 are shown in broken line). The disk drive unit 15 is generally positioned towards the front end of the slot 13. The disk drive unit 15 is generally orientated with its base parallel with the x-y plane, i.e. so that the rotating disk within the disk drive unit 15 is horizontal in the apparatus 10 in use. The connector (not shown) of the disk drive unit 15 generally faces the rear of the slot 13 so as to allow connection to be made to the disk drive unit 15 more easily. Each cell 12 has a top wall 20, a bottom wall 21 and two side walls 22,23 provided by the housing 11. Each slot 13 has a top wall 24, and bottom wall 25 and two side walls 26,27. A mounting arrangement 28 is provided between the cell 12 and the slot 13 to secure the slot 13 within the cell 12 and to provide isolation for the slot 13.

Figure 4:
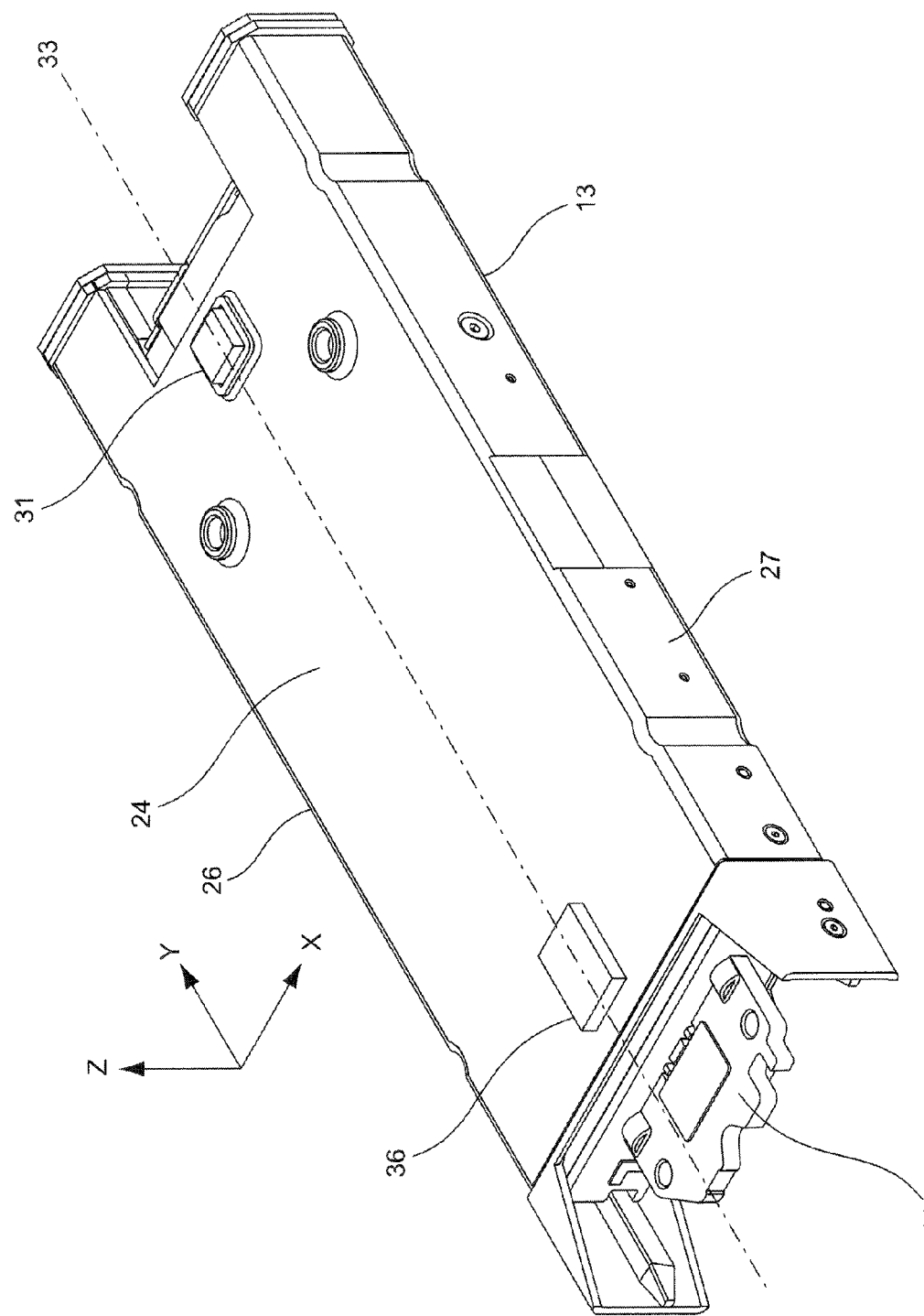
FIG. 4 shows from the front, side and top a slot of the apparatus of FIG. 1.
Figure 5:
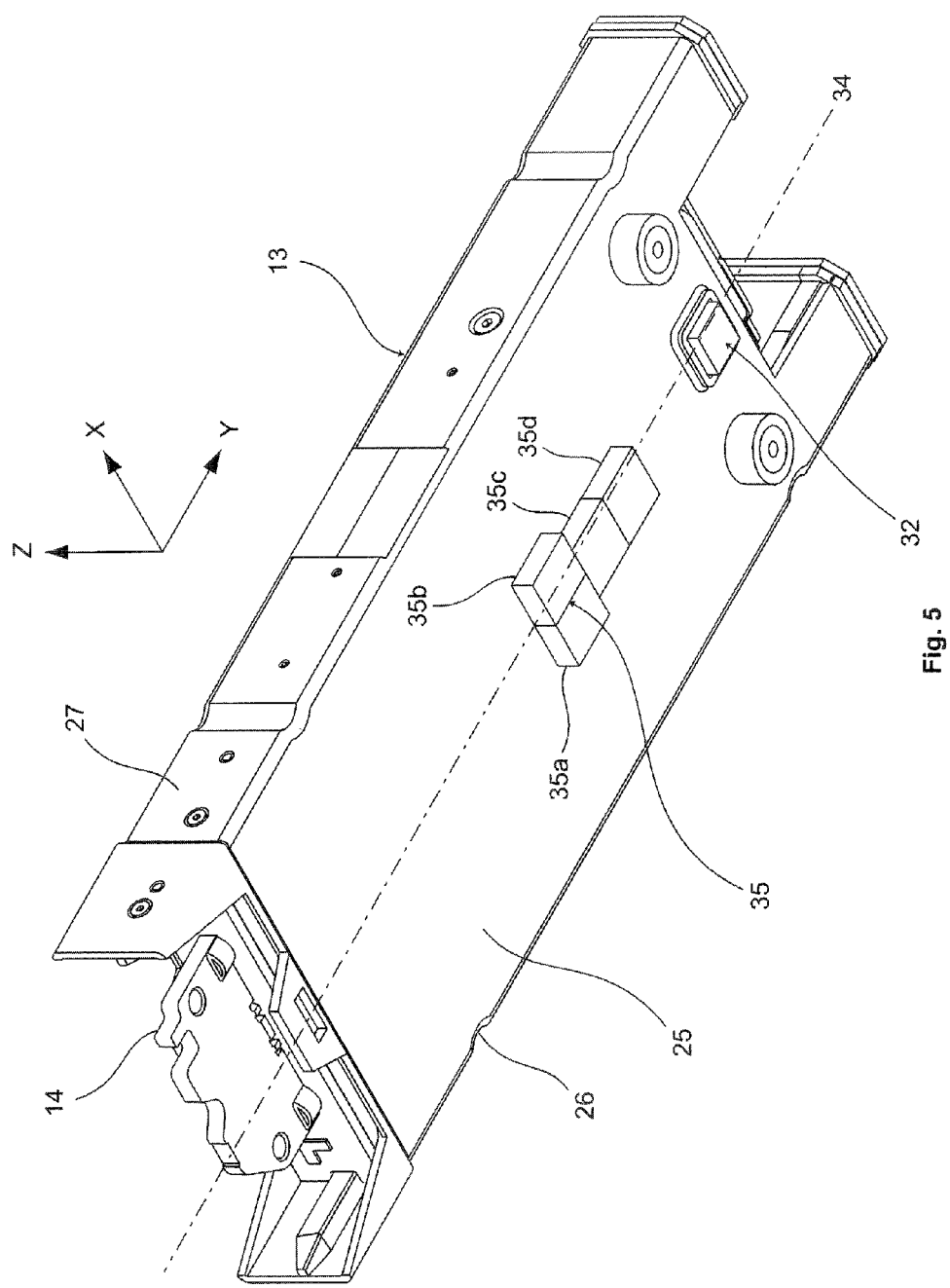
FIG. 5 shows from the front, side and bottom of the slot.

The mounting arrangement 28 comprises a plurality of isolators, each of which are fixed between a wall of the cell 12 and a wall of the slot 13. The particular arrangement of the mounting arrangement 30 is best illustrated by FIGS. 4 and 5.

Each slot 13 has two isolators 31,32 positioned near the rear of the slot 13 consisting of a sheet isolator 31 on the top wall 24 of the slot 13 and a sheet isolator 32 on the bottom wall 25 of the slot 13. The rear isolators 31,32 are keyed into their respective walls 24,25 of the slot 13. The top rear isolator 31 is positioned on the centreline 33 of the top wall 24 of the slot 13 in the y-axis. The bottom rear isolator 32 is positioned on the centreline 34 of the bottom wall 28 of the slot 13 in the y-axis. The top rear isolator 31 is positioned above the bottom rear isolator 32 (i.e. aligned in the z-axis).

A further isolator 35 is positioned on the bottom wall 28 of the slot 13 towards the centre of the bottom wall 28 of the slot 13. This centre isolator 35 consists of a T-shape pattern of four sheet isolators 35a-35d and is symmetrically arranged with respect to the centreline 34 of the bottom wall 28 of the slot 13 in the y-axis.

A further isolator 36 is positioned on the top wall 24 of the slot 13 towards the front of the slot 13. This front isolator 36 consists of a sheet isolator positioned on the centreline 33 of the top wall 24 of the slot 13 in the y-axis.

The walls of the slot 13 and the cell 12 are constructed so as to be rigid to provide a reaction surface for the isolators. The walls may for example be made from plastics material. The slot 13 and cell 12 each have four walls (top, bottom and two side walls), such that in principle, isolators may be positioned anywhere on these walls.

The primary purpose of the rear isolators 31,32 is to provide a relatively rigid reaction surface which maintains the position of the slot 13 in the y-axis (Ly position). As described above, automation may be used to swap disk drive units 15 in the apparatus 10. This typically involves the slot 13 receiving a "plugging force" from the automation in the direction of the y-axis as the tray 14 is pushed home and the connector of the disc drive unit 15 makes connection with a reciprocating connector (not shown) in the slot 13. The plugging force acts to displace the slot 13 in the y-axis, i.e. towards the rear of the apparatus 10. The rear isolators 31,32 are made sufficiently stiff in order to return the slot 13 to its normal position after being displaced by the plugging operation.

The rear isolators 31,32 also provide sufficient isolation to the slot 13 to prevent cross-talk between vertically adjacent cells 12 when the slots share a common reaction surface. For example as shown in FIGS. 2 and 3 the same interior wall of the housing 11 provides the bottom wall 21 of cell A and the top wall 20 of cell B. It is desirable to prevent as much as possible vibration generated from one slot 13 from being transmitted to an adjacent slot 13. The rear isolators 31,32 are therefore arranged to isolate vertically adjacent slots 13 from each other.

The front isolator 36 provides a constraint and damping to reduce displacement from the automation that would excite Rz vibration at low frequencies. As mentioned in more detail below, the slot 13 has a higher stiffness (i.e. a higher natural frequency) for Rz motion than for Ry motion.

The arrangement of the centre isolator 35 provides the main vertical support to the slot 13. The centre isolator 35 is highly damped for Rx and Rz motion. Due to positioning of the central isolator 35 close to the centreline 34 of the bottom wall 21 of the slot 13 in the y-axis, the centre isolator 35 provides relatively little stiffness to the Ry motion of the slot 13, i.e. the rotation of the slot 13 about the y-axis, meaning that the slot 13 can rotate about the y-axis relatively easily. In effect, the slot 13 is balanced on the centre isolator 35 in the direction of the y-axis. This means that the slot 13 has a low natural frequency for Ry motion. As will be appreciated, the other isolators 31,32,36 at the front and rear of the slot 13 are also positioned along the respective centrelines 33,34 of the top and bottom walls 24,25 of the slot 13. This positioning maintains the low stiffness in about the y-axis and thus also promotes the low natural frequency of the slot 13 for Ry motion.

The centre isolator 35 has some material spread from the centreline 34 (i.e. the "arms" of the T-shape isolator). This is to tune the stability of the slot 13 and to provide some damping.

The isolators 31,32,35,36 serve to define an axis of rotation for the slot 13 in the y-axis. Preferably, this axis of rotation is approximately midway between the centrelines 33,34 of the top and bottom walls 24,25. In effect, due to the proximity of the isolators 31,32,35,36 to the centrelines 33,34 of the top and bottom walls 24,25 and the relatively short height of the slot 13, the isolators 31,32,35,36 are in effect positioned to be close to the axis of rotation of the slot 13 in the direction of the y-axis. This promotes low stiffness about the y-axis leading to a low natural frequency for Ry motion. Preferably the stiffness about the y-axis is lower than the stiffness about the x-axis or z-axis. It is expected that for typical implementations, Ry will be preferably lower than 50 Hz.

A low natural frequency in the Ry motion is desirable because it has been found that there are typically fewer noise sources at low frequencies for Ry. Typical noise sources are found as follows: Rx<20 Hz, Ry<25 Hz and Rz is 60 Hz to 120 Hz or even higher depending for example on the drive rotational speed of the drive being tested. Thus, by achieving a low natural frequency in Ry, the higher frequency noises can be better isolated such that the effect of the external noise sources on the disk drive unit 15 is reduced. In other words, the typical Ry noise is not at a frequency that can cause problematic Ry rotation to occur.

The isolators 31,32,35,36 combine to provide sufficient stiffness and a sufficient level of damping in the Rx mode to prevent droop/creep issues. The automation used to exchange disk drive units 15 in the slots 13 is typically very sensitive to the precise and repeatable positioning of the slot 13 so that the automation can successfully interface with the slot 13. A particular problem in this respect is the vertical positioning of the front of the slot 13. The vertical positioning of the front of the slot 13 is affected in particular by Rx motion. Furthermore, the stiffness of the isolators can, depending on their construction and the materials used, vary with temperature. This means that the front of the slot 13 may creep/droop under its weight when a change of temperature occurs. In the present arrangement, the isolators 31,32,35,36 combine to provide a sufficient stiffness and level of damping in the Rx mode to prevent droop/creep issues as well as to damp the "out of balance" vibration. The out of balance vibration is referring to the magnitude of the excitation at the frequency of the spindle of the disk drive. As will be appreciated, if the disks and spindle are not well balanced the there will occur a high level of vibration at the rotational frequency of the spindle. In other words, the out of balance frequency is the first fundamental of the rotation of the spindle.

Linear vibration issues are also dealt with well with this arrangement of isolators. In general, dealing with linear vibration levels is less of a problem than rotational vibration and generally, when looking at the drive requirements, an acceptable solution to dealing with the rotational vibration levels will also deal with linear vibration levels.

The isolators for example may be comprised of sheets of various soft elastomers and gels which do not contain silicon. The isolators may be the same for each isolator 31,32,35,36 or isolators with different properties can be used to tune the performance of the isolation system in each dimension.

Another scheme for the isolation of a disk drive carrier is disclosed in the commonly owned US patent application U.S.

Pat. No. 2008/0007865 published 10 Jan. 2008, the content of which is hereby incorporated in its entirety. U.S. Pat. No. 2008/0007865 teaches a carrier (generally analogous to the slot of the present invention) having a fixed vertical pivot towards the rear of the carrier. It has been found that U.S. Pat. No. 2008/0007865 works well at reducing Rx and Rz vibration. However, Ry vibration can still be problematic in some situations. In general, it is found that for Rz biased systems, such as the arrangement of U.S. Pat. No. 2008/0007865, the Rz vibration tends to excite a secondary Ry mode of vibration that is close to the drive out of balance frequency. The Ry mode of vibration can therefore have a negative effect on the performance of the disk drive unit.

As mentioned above, the rear isolators 31,32 of the present arrangement are highly loaded and thus permit only small movement of the rear of the slot. The rear isolators 31,32 thus perform to some extend a similar function in controlling the movement of the slot as the fixed pivot arrangement of U.S. Pat. No. 2008/0007865 and thus provide similar advantages to the fixed pivot arrangement of U.S. Pat. No. 2008/0007865 in controlling Rx and Rz modes of vibration. However, whereas U.S. Pat. No. 2008/0007865 provides isolators that are at the side of the carrier, in the present arrangement the isolators have been moved in effect away from the sides of the slot 13 and towards the centreline 33,34 of the slot 13 to allow for the low natural frequency in Ry. This allows the Ry to be better controlled as described above. In effect, the modes of vibration have been reordered in the present arrangement. Specifically, in the present arrangement Ry is the first mode of vibration (i.e. it has the lowest natural frequency) due to the low stiffness of the slot 13 about the y-axis. Rx is the second mode of vibration (i.e. it has the second lowest natural frequency). This arrangement means that the Rx and the Ry natural frequencies drop below the out of balance frequency. This in turn means that the vibration arising at the out of balance frequency excites the system to a lesser extent. Rz is the third mode of vibration (i.e. it has the highest natural frequency) due to the large stiffness about the z-axis caused by the separation of the front isolator 36 and the rear isolators 31,32.

As can be seen most clearly from FIG. 2, the centre isolator 35 of slot 1 is axially spaced from the front isolator 36 and top rear isolator 31 of slot 2. This means that these isolators 31,35,36 do not share common wall material of the housing 11. Only the top and bottom rear isolators 31,32 share wall material of the housing 11. This means forces 50 of the isolators 31,35,36 acting on the common wall of the housing are separated by portions of wall. This arrangement reduces potential cross talk between cells 12, since the wall of the housing 11 can be made to absorb vibration energy and thus reduce the vibration energy that is transmitted from one isolator to another isolator. This is in contrast to arrangements of isolators in the prior art, where isolators typically share common walls and thereby are subject to increased risk of cross talk between adjacent disk drive units.

In another example shown by FIG. 6, two spaced walls 20,21 may be provided between vertically adjacent cells A,B so that a gap 29 is formed between the bottom wall 21 of cell A and the top wall 20 of cell B. This allows the walls 20,21 to be isolated from each other. This means that the two adjacent slots 12 do not share common wall material of the housing 11 and so do not have a common reaction surface. This arrangement decreases cross talk between vertically adjacent cells 12.

In general, it is preferred that each isolators 31,32,35,36 is centred on the centreline 33,34 of whichever one of the top and bottom faces 24,25 to which that isolator is fixed. In any case, it is preferred that each isolator 31,32,35,36 extends from its centreline 33,34 by no more than a distance D, where D=50% of the distance from the centreline 33,34 to the side of the slot 13 in the x-axis. More preferably, D=25% of the distance from the centreline 33,34 to the side of the slot 13. Even more preferably, D=15% of the distance from the centreline to the side of the slot 13.

Embodiments of the present invention have been described with particular reference to the examples illustrated. However, it will be appreciated that variations and modifications may be made to the examples described within the scope of the present invention. For example, in another example the bottom rear isolator 32 may be omitted.

The invention claimed is:

1. Apparatus for supporting a disk drive, the apparatus comprising:
a housing;
a slot for receiving a disk drive, the slot being received in the housing and having a longitudinal axis; and,
a plurality of isolators disposed between the slot and the housing for isolating the slot from the housing, the isolators being arranged with respect to the longitudinal axis such that the slot has a low rotational stiffness in the direction of the longitudinal axis relative to the rotational stiffness in at least one other direction,
wherein the slot has a first face parallel to the longitudinal axis, the first face having a centreline parallel to the longitudinal axis and extending along the face, wherein at least one of said plurality of isolators is positioned on the centreline of the first face.

2. Apparatus according to claim 1, wherein the slot has a second face, the second face having a centreline parallel with the longitudinal axis, wherein at least one of said plurality of isolators is positioned on the centreline of the second face.

3. Apparatus according to claim 1, wherein the slot has a second face, the second face having a centreline parallel with the longitudinal axis, wherein each isolator of said plurality is positioned on either the centreline of the first face or the centreline of the second face.

4. Apparatus according to claim 2, wherein two isolators are positioned respectively on the centrelines of the first and second faces so as to be towards one end of the slot and diametrically opposed to each other.

5. Apparatus according to claim 4, wherein an isolator is positioned on the centreline of the first face at the opposite end of the slot to the two diametrically opposed isolators.

6. Apparatus according to claim 4, wherein the slot comprises a disk drive receiving portion located at the opposite end of the slot to the two diametrically opposed isolators.

7. Apparatus according to claim 2, wherein an isolator is positioned midway along the centreline of the second face.

8. Apparatus according to claim 2, wherein the first and second faces are opposed to each other and the separation of the first and second faces is less than the separation of any other opposed faces of slot.

9. Apparatus according to claim 1, wherein each isolator does not extends from the centreline of the face on which it is positioned by more than a distance D, where D=25% of the distance from that centreline to the side edge of the slot.

10. Apparatus according to claim 1, wherein at least some of said isolators are positioned close to the centre of rotation of the slot in the direction of said longitudinal axis such that less rotational stiffness is provided by said at least some isolators in the direction of the longitudinal axis than in said other direction.

11. Apparatus comprising at least two slots according to claim 2, the two slots being adjacent each other such that the first face of one slot is next to the second face of the other slot, wherein an isolator on one of the faces is spaced longitudinally from all isolators on the other face.

12. Apparatus comprising at least two slots according to claim 2, the two slots being adjacent each other such that the first face of one slot is next to the second face of the other slot, wherein the housing between the two slots comprises two spaced walls arranged such that the first wall is at least partially isolated from the second wall.

13. Disk drive test apparatus comprising apparatus for supporting a disk drive according to claim 1 and a test module for testing a said disk drive.

14. A method of testing a disk drive, the method comprising:
   supporting a disk drive in a disk drive test apparatus, the apparatus comprising:
      a housing;
   a slot for receiving a disk drive, the slot being received in the housing and having a longitudinal axis; and,
   a plurality of isolators disposed between the slot and the housing for isolating the slot from the housing, the isolators being arranged with respect to the longitudinal axis such that the slot has a low rotational stiffness in the direction of the longitudinal axis relative to the rotational stiffness in at least one other direction,
   wherein the slot has a first face parallel to the longitudinal axis, the first face having a centreline parallel to the longitudinal axis and extending along the face, wherein at least one of said plurality of isolators is positioned on the centreline of the first face; and,
      testing the disk drive.

* * * * *